(12) United States Patent
Hawkins et al.

(10) Patent No.: US 7,065,078 B2
(45) Date of Patent: Jun. 20, 2006

(54) SWITCHED PLATFORM MANAGEMENT ARCHITECTURE AND RELATED METHODS

(75) Inventors: Pete A. Hawkins, San Luis Obispo, CA (US); Colin N. B. Cook, Riverton, UT (US)

(73) Assignee: Intel Corporation, Santa Clara, CA (US)

( * ) Notice: Subject to any disclaimer, the term of this patent is extended or adjusted under 35 U.S.C. 154(b) by 1017 days.

(21) Appl. No.: 10/075,724

(22) Filed: Feb. 12, 2002

(65) Prior Publication Data
US 2003/0152074 A1 Aug. 14, 2003

(51) Int. Cl.
*H04L 12/56* (2006.01)

(52) U.S. Cl. .................... 370/389; 370/395.31

(58) Field of Classification Search ........... 370/360, 370/386, 389, 392, 393, 396, 397, 398, 399, 370/395.2, 395.3, 395.31, 395.53, 409, 431
See application file for complete search history.

(56) References Cited

U.S. PATENT DOCUMENTS 6,157,644 A * 12/2000 Bernstein et al. ........... 370/392
6,553,029 B1 * 4/2003 Alexander .................. 370/389

* cited by examiner

*Primary Examiner*—Brenda Pham
(74) *Attorney, Agent, or Firm*—Blakely, Sokoloff, Taylor & Zafman LLP

(57) ABSTRACT

A switched platform management architecture and related methods are generally described. In accordance with but one aspect of the present invention, a method is presented comprising receiving a datagram through an intelligent platform management communication channel, and analyzing at least a subset of the received datagram for information necessary to identify routing information of the received content.

18 Claims, 4 Drawing Sheets

FIG. 3
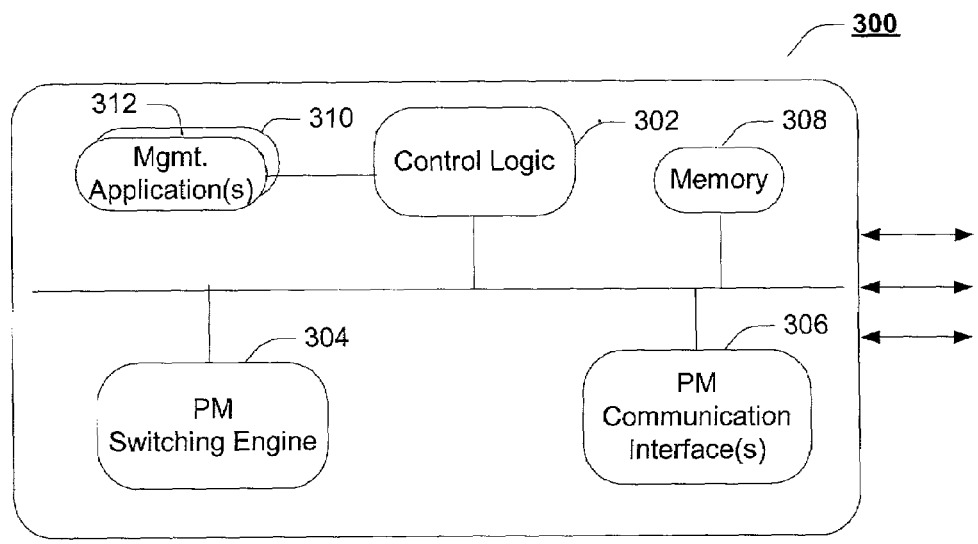
FIG. 4
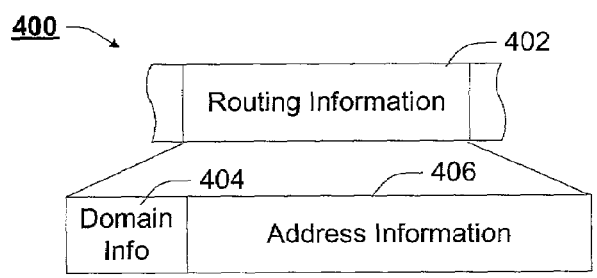
FIG. 5
| Domain | Paddress | PIPMB | Vaddress(es) | Restriction |
|--------|----------|-------|--------------|-------------|
|        | •        |       |              |             |
|        | •        |       |              |             |
|        | •        |       |              |             |

SWITCHED PLATFORM MANAGEMENT ARCHITECTURE AND RELATED METHODS

TECHNICAL FIELD

The present invention generally relates to the field of platform management systems and, more particularly, to a switched platform management architecture and related methods.

BACKGROUND

The demand for online systems and services has driven an unprecedented growth in the network infrastructure to support such demand. To satisfy such growth, manufacturers of server equipment have developed increasingly complex server configurations. As the server systems have become more complex, manufacturers of such systems have received increasing pressure to improve the manageability of such systems.

In an effort to address this pressure, server management systems were developed. A server management system is typically composed of hardware, firmware and software embedded within a server system for the purpose of autonomous monitoring, recovery and control of a server's operation. Preferably, this server manageability is performed independently of the main processor(s), BIOS, and operating system of the server. The ultimate goal of server management is to lower the end-user's total cost of ownership (TCO).

An example of just such a server management architecture is detailed in the Intelligent Platform Management Interface (IPMI) specification or, more formally the *IPMI— Intelligent Platform Management Interface Specification v1.5*, Document Revision 1.0 Feb. 21, 2001, by Intel et al. The IPMI specification, which is incorporated herein by reference for all purposes, describes an architecture of hardware and firmware that monitors and controls a server platform independently of, but responsive to, the main processors and System Management Software (SMS). The IPMI is based on an addressable serial bus communication architecture. An example of a conventional IPMI architecture implementation is presented with reference to FIG. 1.

Turning briefly to FIG. 1, an example of a conventional IPMI architecture 100 is presented. As shown, the conventional IPMI architecture 100 is presented comprising a baseboard control element 102 coupled to a number of satellite control elements 104–110 through a single Intelligent Platform Management Bus (IPMB) 112. As indicated above, the IPMB 112 is typically implemented as an addressable serial bus such as, for example, the Inter-Integrated Circuit ($I^2C$) serial bus and associated communication protocol developed by the semiconductor element of the Royal Philips Electronics N.V. based in the Netherlands, with a regional headquarters in New York, N.Y.

In the IPMI architecture 100 depicted in FIG. 1, the baseboard control element 102 can monitor a myriad of operational aspects affecting/detailing the health of the server system through any one or more of the satellite controller(s) 104–110. In certain implementations, the satellite control elements 104–110 may represent a combination of sensors, control logic, and the like used to monitor and control certain aspects of the server system.

Those skilled in the art will recognize, however, that one of the strengths of platform management architectures such as, e.g., the IPMI architecture, is the relative simplicity of the conventional interconnection structure. This simplicity brings with it a number of limitations, however. First, as a single-bus architecture, a failure of one of the control elements may well bring down (or, "hang") the entire bus. In our IPMI example, above, the conventional IPMB architecture fails to provide adequate fault isolation for the IPMI system.

Second, the IPMB protocol employs a simple seven-bit address scheme to uniquely identify each of the elements on the IPMB. In a conventional IPMI architecture, a single baseboard control element, i.e., the master controller for the entire chassis is given the address of 20 Hex. Insofar as each element within the conventional IPMI system must be uniquely identifiable, and the baseboard control element must have the address of 20 H, such a limitation stipulates that a conventional IPMI system is limited to but a single baseboard control element. As mentioned above, however, complex server systems may well house servers for a number of different clients/purposes within a single chassis. The limitation of a single baseboard control element, described above, would prohibit implementation of a baseboard control element for each of the disparate servers within a chassis. Third, extending the limitations of the seven-bit address scheme, conventional IPMB implementations fail to provide for multiple address domains to, for example, provide secure manageability within each of a plurality of disparate servers populating a server chassis.

Finally, the conventional platform management architectures fail to offer virtual addressing, thereby permitting multiple elements coupled with the conventional interconnect to share a common physical address. Accordingly, an enhanced platform management architecture and associated methods is required, unencumbered by the inherent limitations commonly associated with the prior art. Just such a solution is provided in the discussion to follow.

BRIEF DESCRIPTION OF THE DRAWINGS

The present invention is illustrated by way of example, and not by way of limitation, in the figures of the accompanying drawings in which like reference numerals refer to similar elements and in which:

FIG. 3 provides a block diagram of an example platform management switching element, in accordance with one aspect of the present invention;

FIG. 4 is a graphical illustration of an example datagram suitable for use in the enhanced platform management architecture described herein;

FIG. 5 is a graphical illustration of an example management data structure which may be employed by one or more elements in the enhanced platform management architecture to facilitate the teachings of the present invention;

DETAILED DESCRIPTION

The present invention is generally directed to a switched platform management architecture and related methods. For ease of illustration, the teachings of the present invention will be developed in the context of an example implementation within an Intelligent Platform Management Interface (IPMI) architecture. Those skilled in the art will appreciate, from the discussion to follow, that the broader inventive concept defined within the appended claims may well be practiced in alternate platform management architectures without deviating from the spirit and scope of the present invention. Indeed, such alternate implementations are anticipated within the scope of the present invention.

In this regard, a platform management (PM) switch is introduced to selectively route communications among and between PM elements over any of a number of communication channels established within a plurality of interconnects. According to one example implementation, i.e., the IPMI implementation introduced above, such elements are coupled through the PM switch in a star network topology. Those skilled in the art will appreciate, based on the description to follow, that the star topology enabled by the innovative PM switch facilitates effective fault isolation, multiple address domains and, in this regard, separate communication channels, multi-owner security, and the use of virtual addressing to enable redundant physical addresses within the same address domain. In this regard, the enhanced platform management architecture described herein overcomes the limitations commonly associated with the conventional platform management architectures.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Enhanced IPMI Architecture

Figure 1:
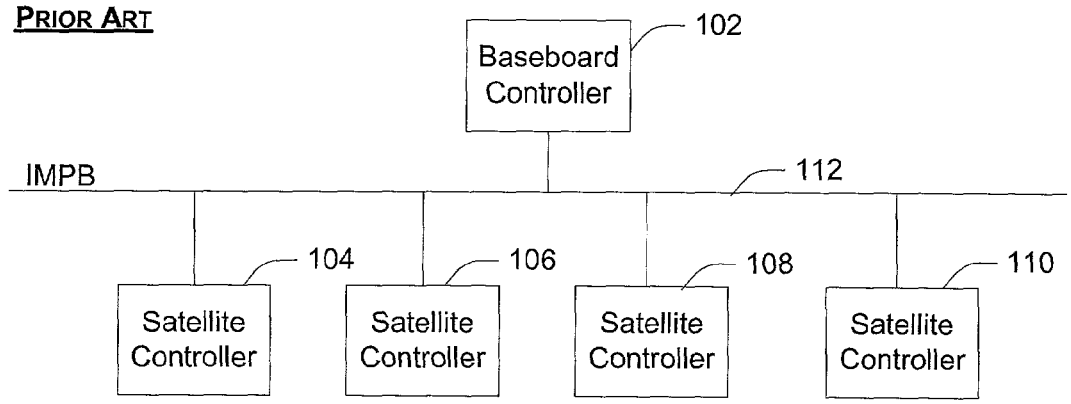
FIG. 1 is a block diagram of a conventional intelligent platform management interface (IPMI) architecture.
Figure 2:
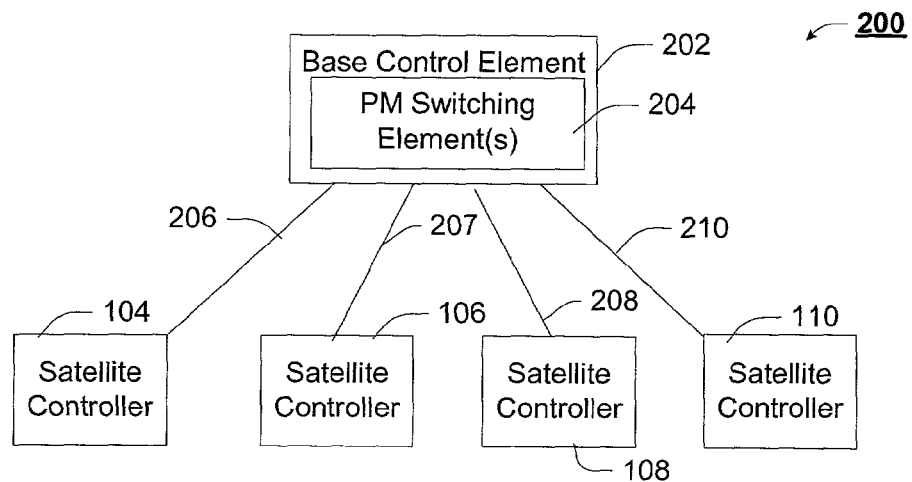
FIG. 2 illustrates two alternative embodiments of an enhanced platform management architecture utilizing an innovative platform management switching element, according to one aspect of the present invention.
Figure 2:
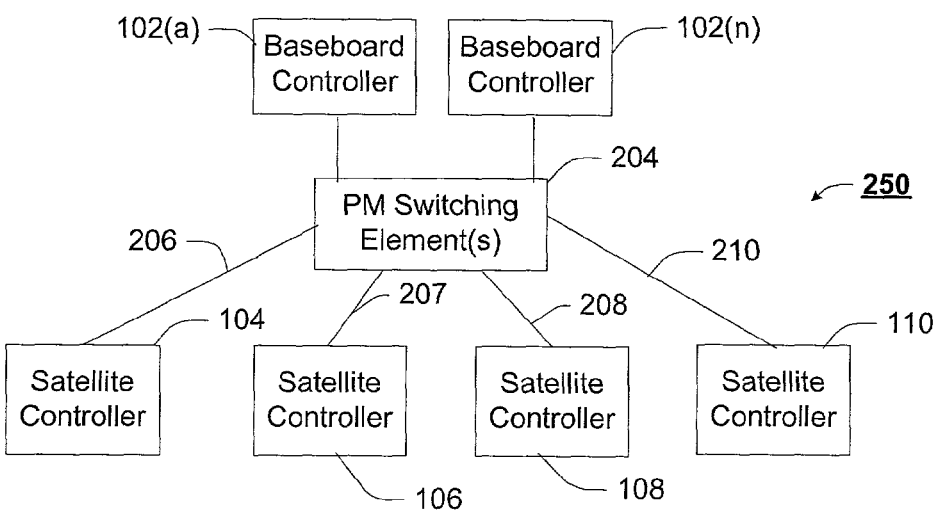

FIG. 2 illustrates block diagrams of alternate example implementations of an enhanced IPMI architecture incorporating the teachings of the present invention. In accordance with the illustrated example implementation of FIG. 2, the enhanced IPMI architecture 200 is depicted comprising an enhanced base control element 202 coupled to each of a plurality of satellite control elements 104–110 through one of a plurality of IPMBs 206–210, respectively. In accordance with the teachings of the present invention, the enhanced base control element 202 is depicted comprising an innovative PM switching element 204. As will be detailed below, the PM switching element 204 effectively couples any of a number of elements 104–110 through any of a number of communication channels established within the plurality of platform management interconnects, e.g., IPMB's 206–210.

To illustrate an alternate implementation, i.e., that of the independent PM switching element 204, attention is drawn to the enhanced platform management architecture 250. As shown, one or more base controller(s) 102A . . . N are coupled with one or more satellite controllers 104–110 through an innovative PM switching element 204 and a plurality of platform management interconnects, e.g., IPMBs 206–210. As above, the star topology effectively couples any of the IPMI elements 104–110 through any of a number of communication channels established within a plurality of IPMBs 206–210.

Those skilled in the art will appreciate that the multi-bus, star topology of the enhanced platform management architecture 200 and/or 250 provides a number of benefits. First, as the elements 104–110 are coupled through physically disparate interconnects, the elements on one such interconnect, e.g., IPMB 206, are communicatively isolated from the elements on another interconnect, e.g., IPMB 208, providing fault tolerance. Moreover, elements on disparate interconnects may (re)use the same physical addresses, separated by use of independent address domain information, or the use of virtual addressing by the PM switching element 204. That is, elements within the same IPMB address domain may well share the same physical address, as the PM switching element 204 distinguishes between such elements using a virtual addressing mechanism described more fully below. In addition, the switching element 204 facilitates the creation of separate address domains, wherein certain elements of such an address domain are only permitted to communicate with other elements of the address domain. Such address domains may well span multiple physical IPMBs. In this regard, the switching element 204 facilitates the creation of multiple communication channel(s). Further, by supporting the use of routing restriction requirements, multiple virtual private interconnects, e.g., virtual private IPMBs (VpIPMB), may well be created within the disparate communication channels enabled by the multiple address domains.

Example Platform Management Architecture Switching Element

Turning to FIG. 3, a block diagram of an example platform management (PM) switching element is presented, in accordance with one aspect of the present invention. In accordance with one example implementation, the PM switching element 300 is suitable for use in the enhanced platform management architecture 200 or 250 as switching element 204. As shown, PM switching element 300 is depicted comprising control logic 302, a switching engine 304, one or more PM communication interface(s) 306, a memory subsystem 308 and, optionally, one or more applications 310 including, for example, system management applications 312, each coupled as shown.

In accordance with the illustrated example implementation, control logic 302 controls the overall operation of the switching element 300. In this regard, control logic 302 receives PM messages via the switching engine 304 and communication interface(s) 306, analyzes at least a subset of content of the received message for routing information, and selectively forwards the content to one or more target(s) based, at least in part, on the result of said analysis. In accordance with one aspect of the present invention, to be developed more fully below, control logic 302 employs a management data structure to implement certain features of the present invention such as, for example, the virtual addressing, routing restrictions and the like. According to one embodiment, the management data structure is maintained within, for example, memory subsystem 308.

According to one example implementation of the invention, control logic 302 provides a user interface (e.g., management applications 312) to an appropriate administrator of the system, wherein the administrator can manually associate virtual addresses, set address domains, communication restrictions and the like. In accordance with another example implementation, control logic 302 senses multiple elements within an address domain or a physical interconnect, e.g., IPMB, that share a common physical address, and automatically assigns a virtual address to one or both of the otherwise conflicting devices.

As used herein, switching engine 304 provides a physical interface to selectively couple the platform management communication interface(s) 306 to communication channel(s) established over each of the one or more interconnects (IPMBs) coupled with the switching element 204. As developed more fully below, messages received from a communication channel are sent to control logic 302 via PM communication interface(s) 306. Once the analysis is complete, control logic 302 enables the switching engine 304 to forward the message to a select one or more communication channels established over one or more interconnects, e.g., IPMBs 206–210 based, at least in part, on such analysis. According to one example implementation, switching engine is a multiplexer controlled by control logic 302. In alternate implementations, switching engine merely identifies a domain and/or address information in content received from control logic 302, and automatically routes the message to target(s) via appropriately selected interconnects.

The PM communication interface(s) 306 include the hardware and/or software elements necessary to interface the control logic 302 with the physical communication medium of the interconnect. In this regard, the PM communication interface(s) 306 acts as a network/link layer interface (i.e., in accordance with the conventional Open System Interconnect (OSI) seven-layer model) between the control logic 302 and the physical layer. Accordingly, the PM communication interface(s) 306 include the hardware and software stacks necessary to support such communication.

Memory subsystem 308 is intended to represent a wide range of devices, logic and/or registers used to store content. In this regard, memory subsystem 308 may well be comprised of volatile memory elements, non-volatile memory elements, optical or magnetic mass storage devices, or virtual memory elements such as, for example, logical buffers and/or programmatic variables. As introduced above, as pertaining to the teachings of the present invention, memory subsystem 308 may well maintain a management data structure used by, for example, control logic 302 or switching engine 304 to resolve addressing and/or routing information. As will be developed more fully below, the management data structure may well include information for each of the elements within the enhanced platform management system 200, 250 denoting at least a physical address, associated virtual address(es) if any, and/or routing restrictions associated with the address(es) if any.

As shown, switching element 300 optionally includes one or more applications 310 including, for example, one or more management applications 312. According to one example implementation, such as, e.g., a stand-alone switching element implementation (e.g., 250 of FIG. 2), switching element 300 provides an administrator with a management user interface through which the administrator can manage certain aspects of the system. For example, the user interface application may enable the administrator to set address domains, virtual addresses, establish routing rules or virtual private communication channel(s), etc. Additionally, such applications 310 may well include automated monitoring and remedy applications, e.g., SMS tools. In an alternate implementation, such applications 310 may well include content which, when executed by accessing control logic 302, implements the analysis and switching features described herein.

It will be appreciated by those skilled in the art that, although presented in accordance with a hardware paradigm with reference to a block diagram, switching element 300 may well be implemented in software, firmware or some combination of all of the above. According to one example implementation, switching element 300 is implemented as an integrated circuit. Accordingly, functional elements 302–312 may well be implemented in any combination of hardware, software and/or firmware without deviating from the spirit and scope of the present invention. Moreover, it should be appreciated that the particular architecture of the illustrated example switching element is just that, an example. Accordingly, switching elements of greater or lesser complexity which nonetheless implement the features described herein are contemplated within the scope and spirit of the present invention.

Example Data Structure(s)

Turning to FIG. 4 a graphical representation of a subset of an enhanced platform management datagram is depicted. In accordance with the illustrated example diagram of FIG. 4, a datagram (or, message) 400 is depicted comprising, in part, routing information 402. As introduced above, in accordance with our example IPMI implementation, the single bussed, conventional platform management architecture does not truly employ "routing" information. Instead, as introduced above, a conventional IPMI datagram includes a seven-bit destination address. Every element on the IPMB 112 receives the datagram and, if the destination address matches an elements physical address, that element accepts and acts on the received datagram, otherwise, the datagram is disregarded by the element.

In contrast, the enhanced platform management architecture datagram 400 of the present invention selectively employs routing information 402. Routing information 402 may well be comprised of a destination address and is, in this regard, compatible with legacy IPMI implementations. Routing information 402 may alternatively comprise information distinguishing different address domains (i.e., domain information) 404, and address information 406 denoting one or more of a source address and/or a destination address associated with elements participating in the communication of the datagram. According to certain implementations, the innovative switching element 204 supports routing of streams of information, wherein routing information 402 will only appear in a select subset of datagrams communicated between select platform management elements (sensors, controllers, etc.).

According to one example implementation, the routing information 402 is contained within a seven-bit address space (i.e., in accordance with conventional implementations), wherein two (2) bits are allocated to the domain information, while the remaining five (5) bits are allocated to the address information. In accordance with this implementation, the two most-significant bits in the field 402 represent address domain information 404, while the remaining five least-significant bits in the field 402 represent address information 406. In certain other implementations, routing information 402 of greater or lesser complexity may well be used without deviating from the scope and spirit of the present invention.

As introduced above, introduction of the PM switching element 204 enables multiple communication channels established over multiple interconnects (IPMBs) within the enhanced platform management architecture. Moreover, the PM switching element 204 enables multiple address domains. It is noted that multiple IPMBs may share a single address domain. Similarly, multiple address domains may well be established between select elements coupled to a common IPMB. In this regard, to uniquely identify an element within the enhanced IPMI architecture of, for example, FIG. 2, a control element may specify not only the destination address of a target, but also the address domain within which the target is found.

In addition, address information 404 may well be comprised of physical address information associated with an PM element and/or virtual address information associated with that element. The establishment and use of virtual addresses enables multiple elements within a common address domain to share the same physical address. That is, if two devices within an address domain share a common physical address, control logic 302 will assign one or more of such elements a unique virtual address to enable the devices to share a common physical address, while directing communication traffic to only a desired one of such elements. To facilitate such "intelligent" switching features, the IPMI switching element 204 maintains a switching management data structure, introduced above. An example of just such a data structure is presented with reference to FIG. 5.

FIG. 5 illustrates an example switching management data structure, according to one aspect of the present invention. In accordance with the illustrated example implementation denoted in FIG. 5, the data structure 500 is depicted comprising a domain field 502, a physical address field 504, a physical IPMB field 505, a virtual address(es) field 506 and, optionally, a routing restrictions field 508. According to one example implementation, the management data structure 500 resides within memory 308 of the IPMI switching element 204. It will be appreciated that the data structure 500 of FIG. 5 is but an example, and that management data structures of greater or lesser complexity may well be used without deviating from the spirit or scope of the present invention. In this regard, for example, switching element 204 may well maintain a separate management data structure for each of a plurality of address domains supported by the switching element and, accordingly, would not specify a domain field within such a data structure since each of the elements denoted within the data structure would enjoy the same address domain.

In accordance with the illustrated example implementation of FIG. 5, for each element within an address domain, the switching element 204 maintains a plurality of records 510, typically one or more record(s) for each element within our example enhanced IPMI architecture. As depicted, each record 510 of the data structure contains information associated with one or more of a physical address 504 associated with an element, a physical IPMB, or interconnect, 505 associated with an element, an associated zero or more virtual address(es) 506 associated with the physical address and physical interconnect if necessary and, optionally, whether there are any restrictions 508 associated with data received from or transmitted to the denoted IPMB element. As will be developed more fully below, switching element 204 receives a datagram for routing, resolves routing information typically with reference to the management data structure 500, and selectively routes the datagram to its intended target(s) through switching engine 304 and an appropriate one or more communication channels established within one or more interconnects (e.g. IPMBs).

As introduced above, the physical address information denotes the physical address of an element within an address domain or, alternatively, a disparate IPMB. The physical IPMB denotes the physical IPMB on which the element is connected. The virtual address information is established to facilitate the use of multiple physical addresses within a single IPMB or a single address domain spanning multiple IPMBs. By maintaining virtual addressing information within the management data structure 500, switching element 300 privately correlates one or more virtual addresses to a corresponding physical address and physical IPMB.

As introduced above, the routing restrictions denote which elements may communicate with which other elements or, alternatively, which elements may not communicate with which other elements. In this regard, the use of the routing restrictions enable virtual private communication channels within an address domain spanning multiple IPMBs or within a single IPMB.

Example Operation and Implementation

Figure 6:
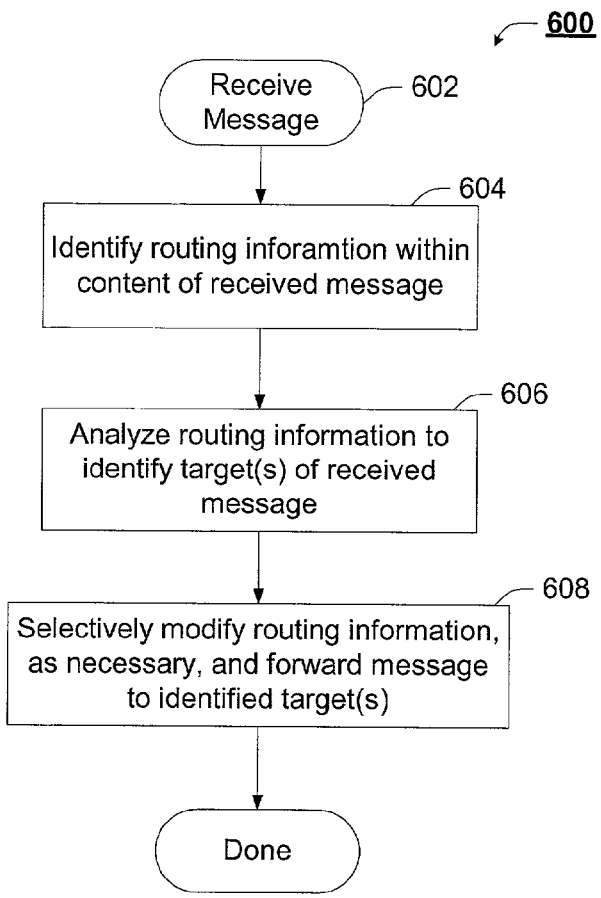
FIG. 6 is a flow chart of an example method of implementing an enhanced platform management architecture.
Figure 7:
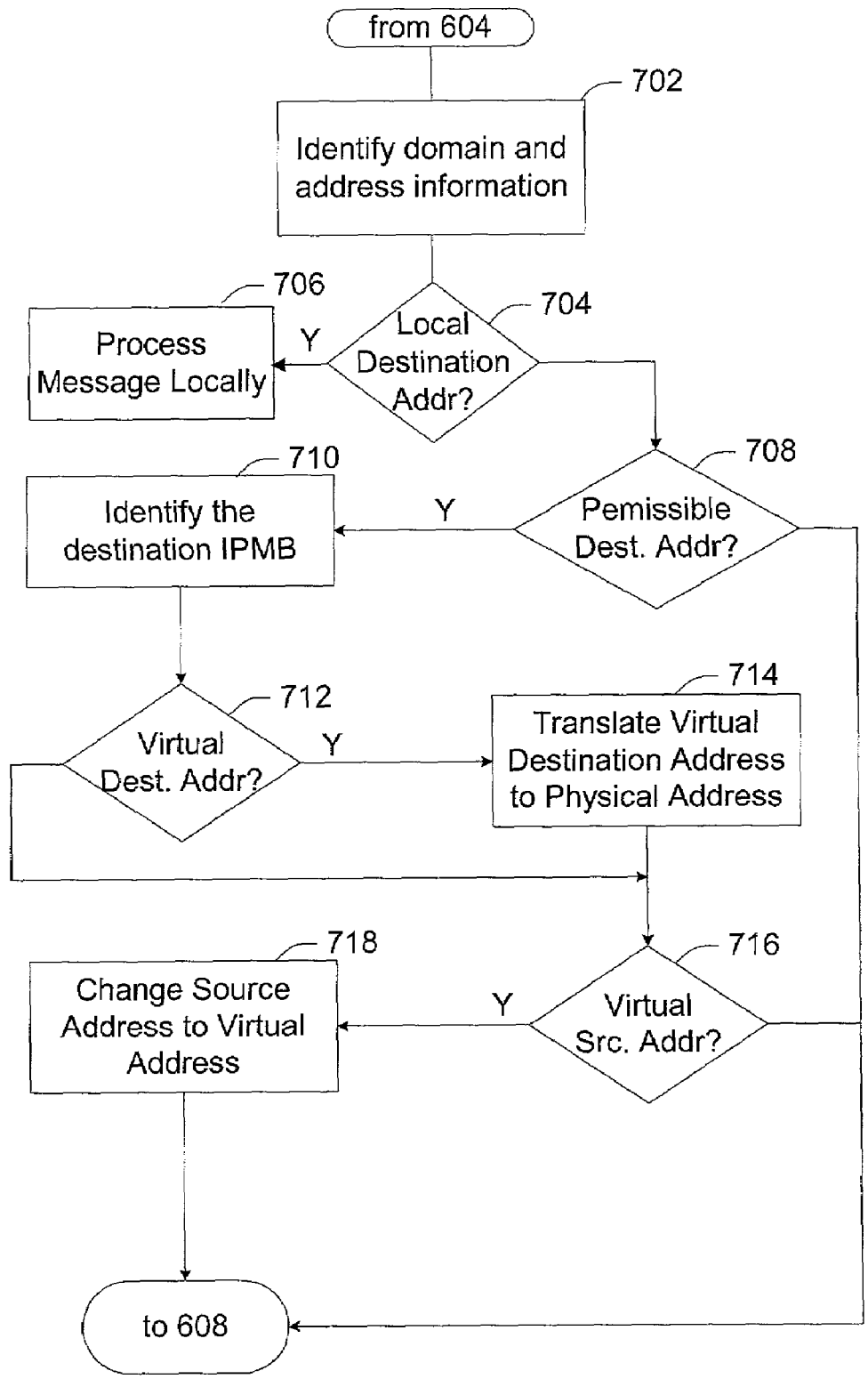
FIG. 7 is a flow chart of an example method of routing messages within the enhanced platform management architecture, in accordance with one aspect of the present invention.

Having introduced the operating environment and architectural elements of the present invention, above, attention is now directed to FIGS. 6 and 7 wherein an example implementation of the platform management (PM) switching element 204 is presented in greater detail. For ease of illustration, and not limitation, the methods of FIGS. 6 and 7 will be developed with continued reference to the example IPMI architecture implementation and to FIGS. 2–5, as appropriate. Nonetheless, it is to be appreciated that the teachings of the present invention may well be implemented in alternate platform management architectures/configurations without deviating from the spirit and scope of the present invention.

Turning to FIG. 6, a flow chart of an example method of implementing an enhanced PM architecture is introduced. In accordance with the illustrated example implementation of FIG. 6, the method begins with block 602 wherein a PM switch 204 receives a message 400 from a PM architecture element through an interconnect (e.g., IPMB). As introduced above, the message is received by the switching element 204 through an appropriate one of the IPMI communication interface(s) 306 and switching engine 304 coupled with the IPMB in which the transmitting IPMI element resides.

Once received, the switching element 204 analyzes the content of the received IPMI message 400 to identify routing information 402, block 604. More particularly, as described above, the received message 400 is passed from the switching engine 304 through the communication interface 306 to the control logic 302, which analyzes the message for routing information 402 denoting one or more of a domain information 404 and/or address information 406.

Based, at least in part, on the information identified within the received message 400, switching element 204 identifies one or more target element(s) of the received IPMI message 400, block 606. More specifically, as detailed below with reference to FIG. 7, control logic 302 compares routing information 402 of the received message against the content of the management data structure 500 to identify routing parameters for the received message.

Once the target is identified, the switching element 204 selectively routes the message 400 to its intended target through an appropriate one or more communication channel(s) established within one or more interconnects (IPMBs), block 608. That is, control logic 302 selectively modifies the routing information 402 of the message 400, as necessary, and forwards the message 400 to the intended recipient(s) through the IPMI communication interface(s) 306 and an appropriate one or more IPMB's, block 608. As introduced above, control logic 302 may well modify physical address information to virtual address information, or vice versa in accordance with the routing rules contained within the management data structure 500. Once the message is ready for forwarding, control logic 302 enables switching engine 304 to receive the message from IPMI communication interface 306 and route the message to an appropriate one or more IPMBs.

In FIG. 7, a flow chart of an example method for routing content within the enhanced platform management architecture is presented, according to one example embodiment of the present invention. In accordance with the illustrated example implementation of FIG. 7, the process of analyzing the routing information 606 begins with block 702 wherein control logic 302 identifies one or more of domain 404 and/or address 406 information within the routing information 402 of the received message.

In block 704, control logic 302 determines whether the routing information 402 denotes that the switching element 204, or the host of the switching element 204 (e.g., base control element 202) is the intended destination of the received message. If so, the process continues with block 706, wherein the received message 400 is processed locally, block 706. According to one example implementation, an application 310 may process the received message.

If, in block 704, the routing information 402 does not indicate a local destination address, the process continues with block 708 wherein control logic 302 determines whether the routing information 402 contains a permissible destination address. According to one example implementation, control logic 302 accesses the management data structure 500 to determine whether the address information corresponds to a valid PM element.

Assuming that the address information denotes a legitimate PM element, control logic 302 determines whether any restrictions are in place that would prohibit forwarding of the message from the particular source element to the destination denoted by the address information. As indicated above, switch element 204 facilitates different address domains and could, therefore, prohibit communication between select elements of different address domains.

If, in block 708, control logic 302 determines that the address information does not denote a permissible destination address, the process continues with block 608 wherein the selective nature of the forwarding results in the message being discarded. According to certain alternate implementations the failed attempt may result in an indication of error being sent from the switching element 204 to the source of the received message, and/or the logging of the failed attempt.

If, in block 708, control logic 302 determines that the routing information does, indeed, include a permissible destination address, control logic 302 identifies which one or more IPMB's are associated with the destination address, block 710. That is, control logic 302 identifies from, for example, the management data structure 500, the IPMB(s) the target(s) are coupled with switch element 204.

In block 712, control logic 302 determines whether the destination address resolved from the routing information is a virtual address. Control logic 302 makes such determination with reference to the management data structure 500. If, in block 712, control logic 302 identifies the destination address as a virtual address, control logic 302 translates the virtual address into a physical address, block 714. In accordance with the illustrated example implementation, such translation is performed with reference to the management data structure 500. In alternate implementations, it is conceived that such translation could be performed dynamically through, for example, some hashing of the virtual address to obtain a corresponding physical address associated with the IPMI element.

Once the destination address is identified, control logic 302 determines whether the routing information contains source address information and, if so, whether it is a virtual address, block 716. As above, this determination may well be made from reference to the management data structure 500 or, alternatively, dynamically through some processing of the virtual source address information itself.

If any identified source address information is determined to correspond with a virtual address, control logic 302 translates the physical address into a virtual address, block 718. As introduced above, such translation may well be performed through reference to the management data structure 500 or, alternatively, dynamically by applying the physical address to some conversion logic/process.

Once the physical destination and/or virtual source address(es) have been identified, as above, the process continues with block 608, wherein the received message 400 is selectively forwarded to the one more target IPMI elements denoted by content in the routing information. As indicated above, the control logic 302 may well selectively modify the routing information 402 in the received message from virtual address(es) to physical address(es) and vice versa, while the remaining content of the IPMI message is left undisturbed.

Given the foregoing, those skilled in the art will appreciate that PM switching element 204 comprising control logic 302, switching engine 304 and management data structure 500 can effectively implement a multi-interconnect enhanced platform management architecture and associated methods described above. In this regard, the enhanced platform management architecture enabled by the switching element 204 facilitates multiple address domains, effective multi-user security, virtual addressing in support of virtual private communication channel(s) within and between interconnect(s), and effective fault isolation.

ALTERNATE EMBODIMENT(S)

Figure 8:
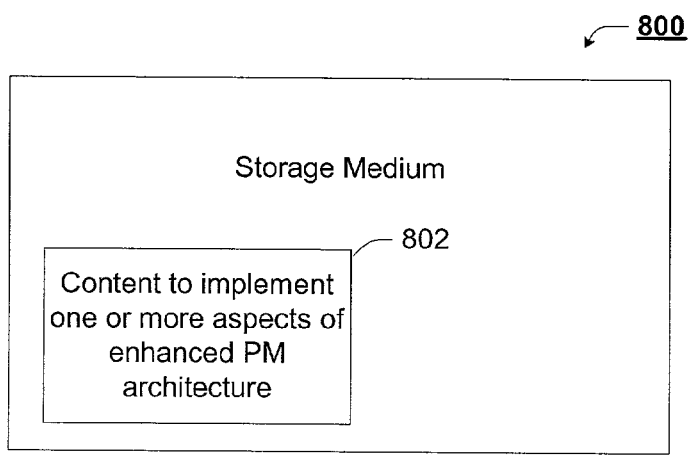
FIG. 8 is a block diagram of an example storage medium comprising a plurality of executable instructions which, when executed, cause an accessing machine to implement one or more aspects of the enhanced network interface, in accordance with an alternate embodiment of the present invention.

FIG. 8 is a block diagram of an example storage medium comprising a plurality of executable instructions which, when executed, cause an accessing machine to implement one or more aspects of the innovative enhanced PM architecture described herein. In this regard, storage medium 800 includes content 802 for implementing a platform management switching element 204, which enables one or more of the effective fault isolation, multiple address domains, multi-owner security, and the use of virtual addresses to support the use of a virtual private interconnect features of the present invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 2–6, or may be embodied in machine-executable instructions, which may be used to cause a general-purpose or special-purpose processor or logic circuits programmed with the instructions to perform the steps. Alternatively, the steps may be performed by a combination of hardware and software. Moreover, although the invention has been described in the context of a server system, those skilled in the art will appreciate that such functionality may well be embodied in any of number of alternate embodiments such as, for example, integrated within a computing device, communication network elements, electronic appliances, or any other device where integrated manageability features would be useful.

The present invention may be provided as a computer program product which may include a machine-readable medium having stored thereon content which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem connection, a network connection, a wireless communication signal, and the like).

Many of the methods are described in their most basic form but steps can be added to or deleted from any of the methods and information can be added or subtracted from any of the described messages without departing from the basic scope of the present invention. Moreover, although well-suited for the illustrated example implementation of a server, or cluster of servers, those skilled in the art will appreciate that the IPMI interface in general, and the switched IPMI architecture in particular, may well be implemented in any of a number of electronic appliances So to introduce a level of manageability to the appliance. In this regard, the particular embodiments are not provided to limit the invention but merely to illustrate it. The scope of the present invention is not to be determined by the specific examples provided above but only by the claims below.

What is claimed is:

1. A method comprising:
   receiving a datagram through a platform management communication channel; and
   analyzing at least a subset of the received datagram for information necessary to identify routing information of the received content by identifying a source address within the routing information, and selecting a destination address from a plurality of possible destination addresses based, at least in part, on the identified source address, wherein the source address is a physical address privately correlated with a virtual address of a control element sending the received datagram.

2. A method according to claim 1, further comprising:
   forwarding the datagram towards a destination determined from the analyzed subset of the received datagram.

3. A method according to claim 1, wherein the datagram is received from a control element coupled with the platform management communication channel.

4. A method according to claim 1, further comprising:
   limiting which of a plurality of platform management elements can communicate with a platform management element to establish a virtual private communication channel between such elements.

5. A storage medium comprising content which, when executed by an accessing machine, cause the machine to implement a method according to claim 1.

6. A method comprising:
   receiving a datagram through a platform management communication channel;
   analyzing at least a subset of the received datagram for information necessary to identify routing information of the received content by identifying a destination address within the received datagram and determining whether the identified destination address corresponds to a physical address in a host platform management architecture; and
   forwarding the datagram to the destination address denoted within the received datagram if it is determined to be a physical address within the host platform management architecture;
   resolving a physical address from a virtual address denoted by the destination address in the received datagram if the destination address is found to not be a physical address.

7. A method according to claim 6, further comprising:
   forwarding the datagram to the physical address resolved from the destination address denoted within the received datagram.

8. A method according to claim 6, wherein the routing information comprises address information associated with the destination of the received datagram.

9. A method according to claim 8, wherein the routing information comprises address domain information as well as a unique address identifier to uniquely identify a target of the received datagram.

10. An apparatus comprising:
   a management data structure including content; and
   control logic, coupled with the management data structure, to compare routing information in a received platform management (PM) datagram with the content in the management data structure to identify one or more platform management target element(s) for the received datagram; and
   a switching engine, responsive to the control logic, to selectively couple any of a plurality of PM elements through a plurality of PM communication channels, wherein the switching engine selectively couples the plurality of PM communication channel to the control logic, to facilitate routing of datagrams among and between the PM elements.

11. An apparatus according to claim 10, wherein the plurality of PM communication channels are established within a single platform management bus.

12. An apparatus according to claim 11, wherein the multiple communication channels are established through use of multiple address domains, detailed in the content of the management data structure.

13. An apparatus according to claim 10, wherein the apparatus is an intelligent platform management bus (IPMB) switch.

14. An apparatus according to claim 13, wherein the IPMB switch is embodied within an intelligent platform management interface (IPMI) control element.

15. An apparatus according to claim 13, wherein the IPMB switch is embodied within an integrated circuit (IC) in a server chassis.

16. An apparatus according to claim 10, wherein the plurality of channels are established within one or more platform management interconnect(s) across multiple servers in a server chassis.

17. An apparatus comprising:

a management data structure including content; and control logic, coupled with the management data structure, to compare routing information in a received platform management (PM) datagram with the content in the management data structure to identify one or more platform management target element(s) for the received datagram; and a plurality of records, one or more for at least a subset of PM elements coupled with the apparatus, each of the plurality of records including one or more of an address domain field, a physical address field, a physical interconnect, a virtual address filed and/or a routing restriction field;

wherein the control logic identifies a target element(s) by matching the routing information of the datagram to an address domain and/or a physical address within the management data structure.

18. An apparatus according to claim 17, wherein the control logic identifies a target element(s) by matching the routing information of the datagram to an address domain and/or a virtual address within the management data structure.

* * * * *